(12) United States Patent
Tompkins

(10) Patent No.: US 9,480,884 B2
(45) Date of Patent: Nov. 1, 2016

(54) PEBBLE COVER FOR A SPORTS BALL

(71) Applicant: Baden Sports, Inc., Renton, WA (US)

(72) Inventor: Hugh Tompkins, Renton, WA (US)

(73) Assignee: Baden Sports, Inc., Renton, WA (US)

( * ) Notice: Subject to any disclaimer, the term of this patent is extended or adjusted under 35 U.S.C. 154(b) by 0 days.

(21) Appl. No.: 14/456,999

(22) Filed: Aug. 11, 2014

(65) Prior Publication Data

US 2015/0045159 A1 Feb. 12, 2015

Related U.S. Application Data

(60) Provisional application No. 61/865,057, filed on Aug. 12, 2013.

(51) Int. Cl.
*A63B 41/08* (2006.01)
*A63B 45/00* (2006.01)
*B32B 38/06* (2006.01)
*A63B 43/00* (2006.01)

(52) U.S. Cl.
CPC ............... *A63B 41/08* (2013.01); *A63B 45/00* (2013.01); *B32B 38/06* (2013.01); *A63B 43/002* (2013.01); *A63B 2243/007* (2013.01); *A63B 2243/0037* (2013.01); *B32B 2317/08* (2013.01); *Y10T 156/1039* (2015.01)

(58) Field of Classification Search
CPC .... A63B 43/002; A63B 39/06; A63B 37/12; A63B 45/00; A63B 2243/007; A63B 2243/0037; B32B 38/06; B32B 2317/08; Y10T 156/1039
See application file for complete search history.

(56) References Cited

U.S. PATENT DOCUMENTS

| | | | | |
|---|---|---|---|---|
| 563,170 A * | 6/1896 | Haley | .................. | A63B 43/002 473/595 |
| 744,718 A * | 11/1903 | Cassidy | ........................ | 473/614 |
| 2,078,382 A * | 4/1937 | Hanshaw | ............... | A63B 37/14 473/595 |
| 2,194,674 A * | 3/1940 | Riddell | .................. | A63B 41/08 473/597 |
| 2,494,806 A * | 1/1950 | Gibson | .................. | A63B 41/08 473/596 |
| 2,931,653 A * | 4/1960 | Gow | ...................... | A63B 41/08 473/596 |
| 4,000,894 A * | 1/1977 | Butzen | .................. | A63B 41/08 473/596 |
| 4,570,931 A * | 2/1986 | Martin | .................. | A63B 39/06 473/596 |
| 4,928,962 A * | 5/1990 | Finley | .................... | A63B 41/08 473/596 |
| 4,991,842 A * | 2/1991 | Finley | .................... | A63B 41/08 40/327 |
| 5,028,053 A * | 7/1991 | Leopold | ............... | A63B 43/002 473/473 |
| 5,431,393 A * | 7/1995 | Wang | ..................... | A63B 41/08 473/596 |
| 5,518,234 A * | 5/1996 | Palmquist | .............. | A63B 41/08 473/596 |
| 5,577,732 A * | 11/1996 | Spector | .................. | A63B 65/00 473/576 |
| 6,283,881 B1 * | 9/2001 | Feeney | .................... | A63B 41/08 473/596 |
| RE37,468 E * | 12/2001 | Kennedy | ................. | A63B 41/08 473/596 |
| 6,348,018 B1 * | 2/2002 | Ou | ......................... | A63B 41/08 473/143 |
| 6,612,948 B1 * | 9/2003 | Miller | .................... | A63B 41/08 473/596 |
| 7,413,524 B1 * | 8/2008 | Bibby | .................. | A63B 43/002 473/595 |
| 8,684,870 B2 * | 4/2014 | Ito | .......................... | A63B 41/08 473/596 |
| 2004/0142780 A1 * | 7/2004 | Estefano | ................ | A63B 37/14 473/604 |
| 2007/0117662 A1 * | 5/2007 | Ma | ......................... | A63B 41/00 473/604 |
| 2009/0325742 A1 * | 12/2009 | Krysiak | ................. | A63B 41/08 473/596 |

* cited by examiner

*Primary Examiner* — Steven Wong
(74) *Attorney, Agent, or Firm* — Bruce A. Kaser

(57) ABSTRACT

A leather-based cover material for an inflatable sports ball that consists of a composite of a thin external layer, a filler, and an internal liner. The thin external layer is dimpled by using positive/negative embossing plates to create pebble projections on an exterior side and voids on the other or interior side. The interior side is coated with a filler material that fills the voids. The cover material is completed by attaching a liner layer to the cured filler material.

2 Claims, 4 Drawing Sheets

PEBBLE COVER FOR A SPORTS BALL

This disclosure claims priority on Provisional Appl. No. 61/865,057. The provisional application, which is incorporated here by reference, describes prior art shortcomings that relate to traditionally-made pebbled leather coverings for American footballs.

TECHNICAL FIELD

This disclosure relates to pebbled skin covers for inflatable sports balls. More particularly, the disclosure relates to an improved ball skin cover that is pebbled and a method for making the same.

BACKGROUND OF THE INVENTION

Moisture is the fastest cause of pebble loss. Footballs, in particular, can quickly lose their pebble pattern because they are often used in inclement weather conditions.

To combat this problem, football leather is heavily tanned—the tanning process being used to help lock out moisture and improve the durability of the football. However, heavy tanning makes the leather surface very hard and slick, which negatively impacts the player's grip on the ball—which is the purpose of pebbling, in the first place. For this reason, it is desirable to develop a pebbled ball skin covering that strikes a balance between preventing moisture absorption while providing a reasonable grip.

Although the present description is directed to skin covers for American footballs, it is to be appreciated that the design disclosed here could be applied to other kinds of inflatable balls that use pebble patterns or leather-based covering materials that use pebble patterns. The term "leather-based," as used herein, is meant to include natural and synthetic leathers and other equivalent materials that could be pebbled in the same way for use in conjunction with the manufacture and sale of inflatable sports balls.

Therefore, the term "leather-based" should be regarded as referring to materials other than "natural" leather such as, for example, "synthetic" leather or any other material that could substitute for pebbled leather currently in use. In the known prior art, "pebbled" leather is a layer of leather embossed on one side only. The other side is smooth.

SUMMARY OF THE INVENTION

Disclosed here is a cover material for a ball, such as an inflatable sports ball for use as an American football or a basketball. The cover material includes a first external layer that has a dimpled pattern. The dimpled pattern is a pebble pattern that projects outwardly from an exterior side of the external layer but also has internal dimple spaces or voids on the inside or interior side. The interior dimple spaces are filled with a substrate material that fills the voids defined by the dimple spaces. Positioned inside of the substrate filling material is yet another interior or inner layer, sometimes called a liner layer. The substrate material is sandwiched between the dimpled external layer and the liner layer.

The external layer is dimpled by placing a thin sheet of the leather-based material in between positive and negative embossing plates, one on each side of the thin sheet. Pressing the positive and negative embossing plates together creates an exterior pebble pattern, on one side of the sheet, and an interior pattern of voids on the opposite side, similar to the way corrugated materials have a positive and negative wave pattern across a sheet (cardboard, metal roof, etc.) although, in this case, the positive/negative structural configuration is in the form of pebbles across the expanse of the sheet.

The voids on the interior side are coated with a filler material that is sufficiently liquid to fill the voids. The filler material is cured so that it solidifies on the void-side of the thin sheet, smoothing out that side of the sheet, but leaving a pebble pattern on the other side. This strengthens the sheet and also creates moisture resistance. An interior liner layer is applied to the filler material with the combination of thin sheet, filler, and internal liner creating a skin cover material that can be applied to a ball carcass.

The above and other features are further described below.

BRIEF DESCRIPTION OF THE DRAWINGS

In the drawings, like reference numerals and letters refer to like parts throughout the various views, and wherein.

DETAILED DESCRIPTION

Figure 1:
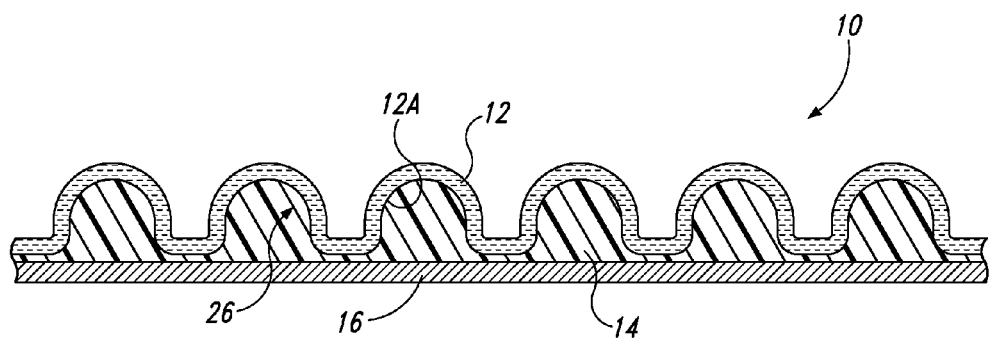
FIG. 1 is a cross-sectional view of an improved cover material constructed in accordance with the present disclosure.

Referring now to the drawings, and first to FIG. 1, found generally at 10 is a cover material for a ball constructed in accordance with a preferred embodiment. The cover material 10 includes an external layer 12 that presents an exterior pebbled surface for a user of the ball. Underneath the exterior layer 12 is a substrate layer 14 that is preferably impervious to moisture and elastic when compressed or stretched. Below the cover material 14 is a liner material 16.

Figure 3:
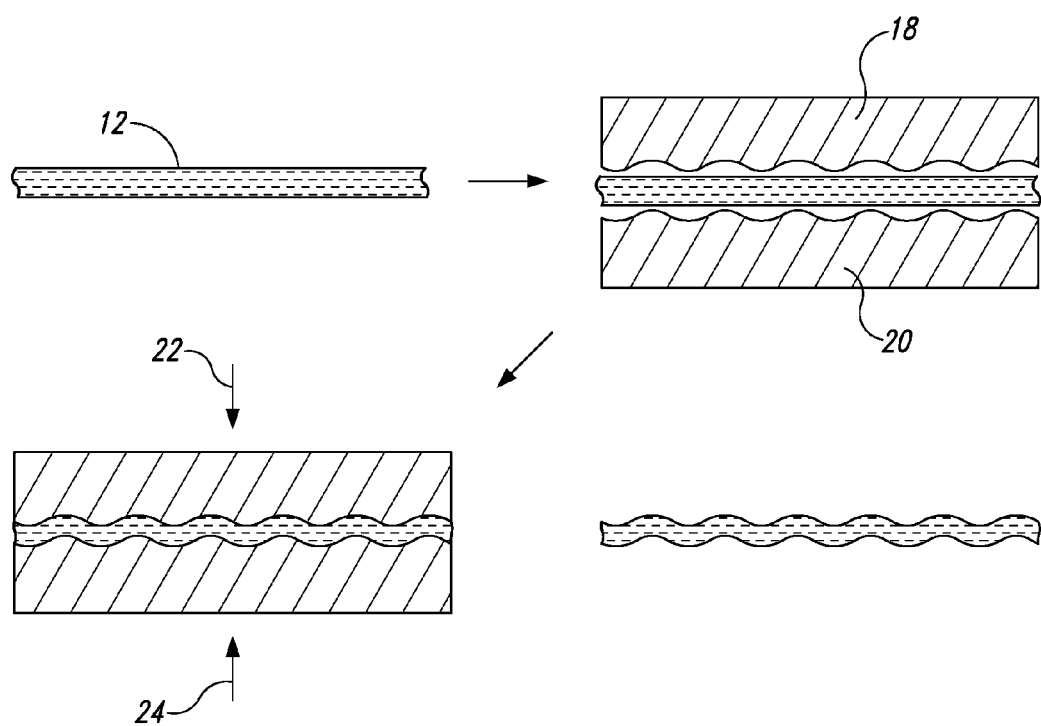
FIG. 3 is a schematic that illustrates how the cover material can be manufactured.

The external layer 12 is a leather-based material that is sufficiently thin that it can be embossed on both sides at the same time. Natural leather is a preferred material for some top quality footballs. Synthetic leather is often used as well. The present disclosure is intended to be used with other equivalent materials. Referring now to FIG. 3, the embossing procedure will be generally described.

The external layer 12 is placed between positive and negative embossing plates 18, 20. These plates, 18, 20 are pressed together as indicated by arrows 22, 24 in the lower left-hand portion of FIG. 3. Pressing the plates 18, 20 together forms the thin external layer 12 into a dimpled pattern that creates the exterior pebbles previously described and the voids on the other side. After pressing, the external layer 12 has the general configuration schematically illustrated in the lower right-hand portion of FIG. 3.

It is to be appreciated that FIG. 3 is a schematic. In actual practice, the dimpled pattern will look very similar to the conventional pebble patterns that are seen on the outside of footballs. The difference is that conventional prior art pebble patterns involve embossing a pebble on only one side of a leather sheet. The other side of the prior art leather sheet is typically left smooth, for attachment to a ball carcass or a liner layer. This conventional technique for creating a pebbled leather ball cover requires that the leather itself be much thicker than what is required compared to the present design disclosed here. By using the positive/negative embossing procedure just described, it is possible to put a pebble pattern on a much thinner layer of leather, with certain advantages.

Referring again to FIG. 1, after the thin external layer 12 is embossed, the voids on the interior, indicated generally by arrow 26, are filled with a glue-like material (such as neoprene glue, as an example). The void side of layer 12, indicated at 12A in FIG. 1, is first coated with the filler substance (e.g., neoprene glue). The glue fills the voids completely, thus smoothing out the void-side of layer 12. This fills each void with a flexible and resilient material that both supports the pebble pattern on the outside and prevents it from pressing in due to the thin nature of layer 12. The purpose of the voids, therefore, is to provide a solid internal structure for what will eventually be the pebble pattern on the outside of the ball.

It is possible that the external and filler material layers 12, 14 may need to be coated more than one time, in order to create the desired thickness or to provide an adhesive surface for the other layer of liner material 16.

The liner material 16 can be made of different kinds of material that are commonly available. In preferred form, the materials selected for liner 16 should be stretch resistant and impervious to water absorption, which is common to the liner materials already in use for traditional leather football construction.

After the cover is constructed in the above-described manner, it may then be applied to a ball carcass. Ball carcasses take different forms, depending on the ball or the internal construction of the ball. The term "carcass" is sometimes a variable, although it is generally understood to mean those parts of the ball that underlie the external skin cover. In a basketball, as an example, the carcass is generally considered to be everything but the orange skin panels. That is to say, a basketball carcass might consist of an internal rubber bladder, covered by windings, covered by another layer of rubber that is used to form seams, with the seams defining the boundaries for placement of the orange skin panels. A finished carcass typically comes out of a mold with everything but the orange skin panels. In some cases, carcasses are made with a layer of foam rubber over the bladder and windings, but underlying strips of seam material. There are also other ways of making carcasses for basketballs.

Football carcasses might include a bladder covered by either windings or one or more layers of liner material. The exterior leather cover is then applied to the carcass arrangement. The specific way football carcasses are made is not material to the present disclosure.

Figure 5:
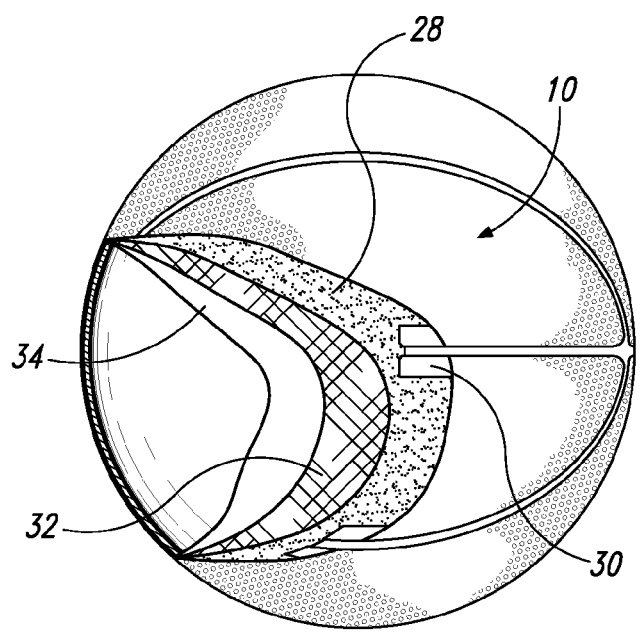
FIG. 5 is a view of a basketball, showing how the cover material may be applied to a basketball carcass.

Bearing in mind the foregoing, FIG. 5 illustrates a basketball that is a "cushioned" ball having a layer of foam as part of the carcass. Reference numeral 10 in FIG. 5 points to the cover material, made in accordance with the foregoing description, which would be attached to the ball carcass as one of perhaps eight separate basketball panels. Underneath the cover material 10 is a layer of foam material 28 (covered by seam strips 30). Underneath the foam material 28 is a winding layer 32. Underneath the winding layer 32 is an inflatable rubber bladder 34.

Figure 2:
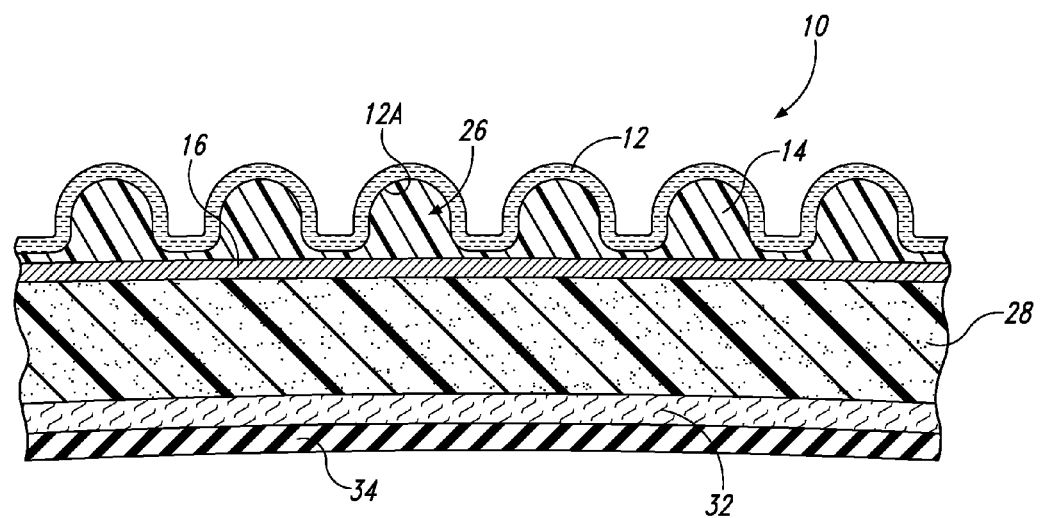
FIG. 2 is a cross-sectional view like FIG. 1, but shows a cover material attached to a ball carcass.

FIG. 2 is a cross-sectional view of FIG. 5, although FIG. 2 does not illustrate the seam strips 30. However, FIG. 2 does illustrate the concept of attaching the cover material, constructed in accordance with the disclosure here, to the ball carcass.

Figure 4:
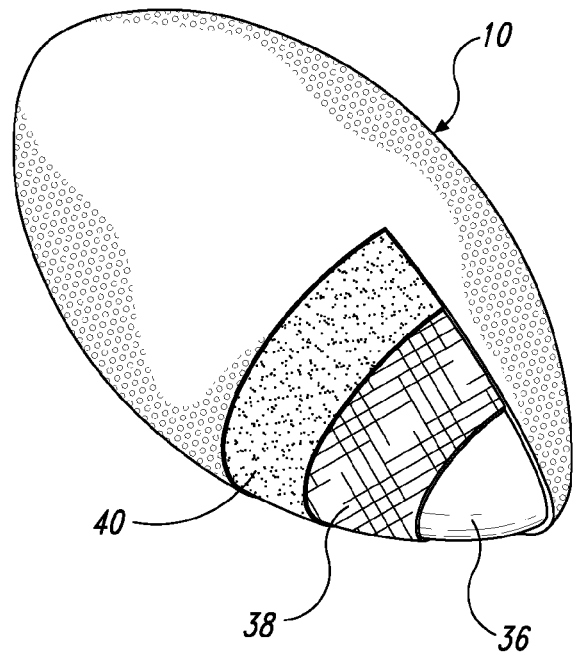
FIG. 4 is a view of an inflated football, showing how the cover material is attached to the football carcass.

FIG. 4 is a football illustration and shows the cover material 10 placed over a football carcass that consists of an internal bladder 36, covered by a winding 38, and further covered by one or more carcass layers 40, before application of the cover material 10. Once again, carcass construction can be a variable.

A person skilled in the art would understand that the cover material described above is intended to be applied to a ball that is manufactured typically carcass first, regardless of the ball type, and regardless of the specific type of carcass construction.

The cover material described above can be made to approximate the same weight as traditional pebbled leather covers (natural or synthetic leather), which allows the cover materials described herein to be used as a substitute for traditional leather in football manufacturing, without any significant alterations to the manufacturing process. In other words, it is possible to produce the cover material 10 independently of where the football is manufactured and then deliver the cover material to the manufacturing location.

Figure 6:
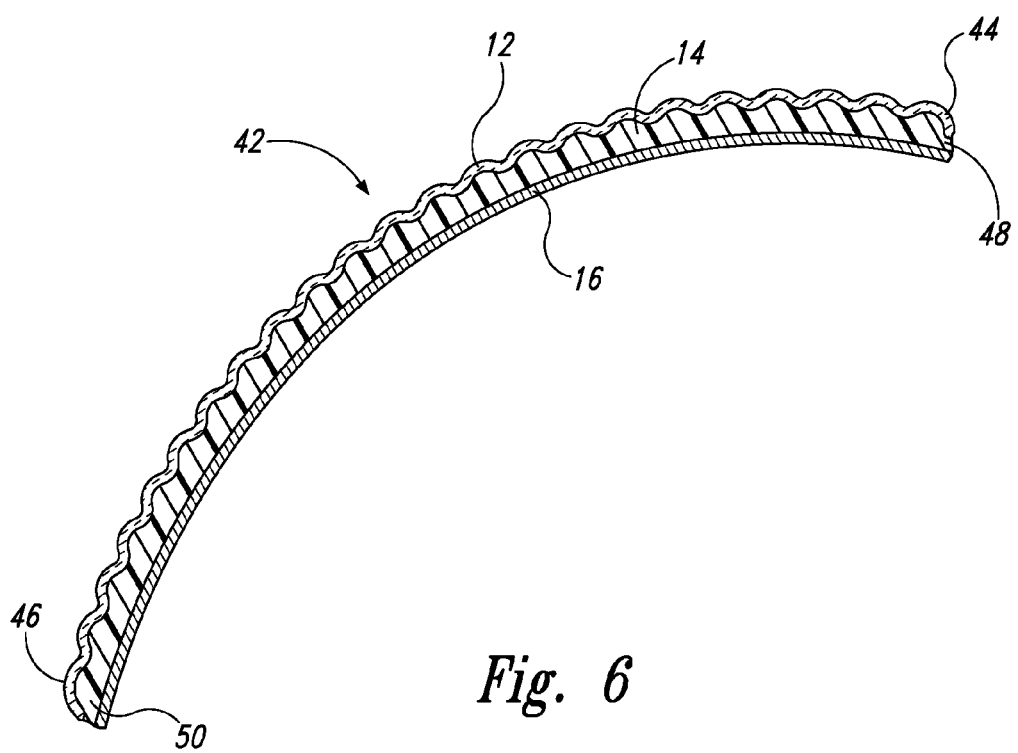
FIG. 6 is a schematic showing how the cover material may be made to produce curved panel sections for a football.

Referring to FIG. 6, the cover material 10 can also be made with predetermined shapes or curves, as generally indicated at 42. In other words, it is possible to make a football panel with a predefined shape intended to match the curvature of the football's carcass. This alternative concept could include creating an enlarged, embossed portion 44, 46, at each edge of the panel 42. These portions 44, 46 would have enlarged voids 48, 50 filled with the foregoing filler material.

There may be other kinds of filler material that could be used that perform the function described above. Neoprene rubber is one selection. There are changes that could be made to the machinery that provides the embossing plate function described above, so long as the embossing plates are performing the positive/negative embossing effect as described.

The scope of the patent right is not intended to be limited to the foregoing description. Instead, the patent right is limited to the patent claim or patent claims that follow, the interpretation of which is to be made in accordance with the standard doctrines of patent claim interpretation.

What is claimed is:

1. A cover for a ball, comprising:
   an external layer having a dimpled pattern that includes a pebble pattern comprising a plurality of exterior pebbles that project outwardly from an exterior side of the external layer and a plurality of interior dimple spaces defining a plurality of voids on an interior side of the external layer;
   a liner layer inward of the external layer for providing a backing layer for the cover; and
   a substrate layer that is elastic and impervious to moisture, the substrate layer being sandwiched between the external layer and the liner layer, with the substrate layer filling the voids defined by the interior dimple spaces, and further,
   the external layer having an outer surface, an inner surface and a thickness separating the outer surface from the inner surface, with the exterior pebbles and interior dimple spaces each having a height that defines an alternating arrangement of peaks and valleys on both the outer and inner surfaces of the external layer, and with the height of the interior dimple spaces being above the height of the valleys on the outer surface of the external layer, in a manner so that the substrate layer fills the voids defined by the interior dimples spaces at a level that is above the outer surface of the valleys, to strengthen the external layer, and still further, the external layer, the liner layer, and the substrate layer together creating the cover for the ball.

2. A ball, comprising:

a cover that includes:

an external layer having a dimpled pattern with interior dimple voids on an inside surface of the external layer;

a liner layer, inside of the external layer, for providing a backing layer for the cover; and a substrate layer that is elastic and impervious to moisture, the substrate layer being sandwiched between the external layer and the liner layer, with the substrate layer filling the interior dimple voids, and further, the external layer having an outer surface, an inner surface and a thickness separating the outer surface from the inner surface, with the exterior pebbles and interior dimple spaces each having a height that defines an alternating arrangement of peaks and valleys on both the outer and inner surfaces of the external layer, and with the height of the interior dimple spaces being above the height of the valleys on the outer surface of the external layer, in a manner so that the substrate layer fills the voids defined by the interior dimples spaces at a level that is above the outer surface of the valleys, to strengthen the external layer, and still further, with the external layer, the liner layer, and the substrate layer together creating the ball's cover; and a ball carcass, underneath the cover, the carcass including an inflatable bladder.

\* \* \* \* \*